Patented Nov. 14, 1922.

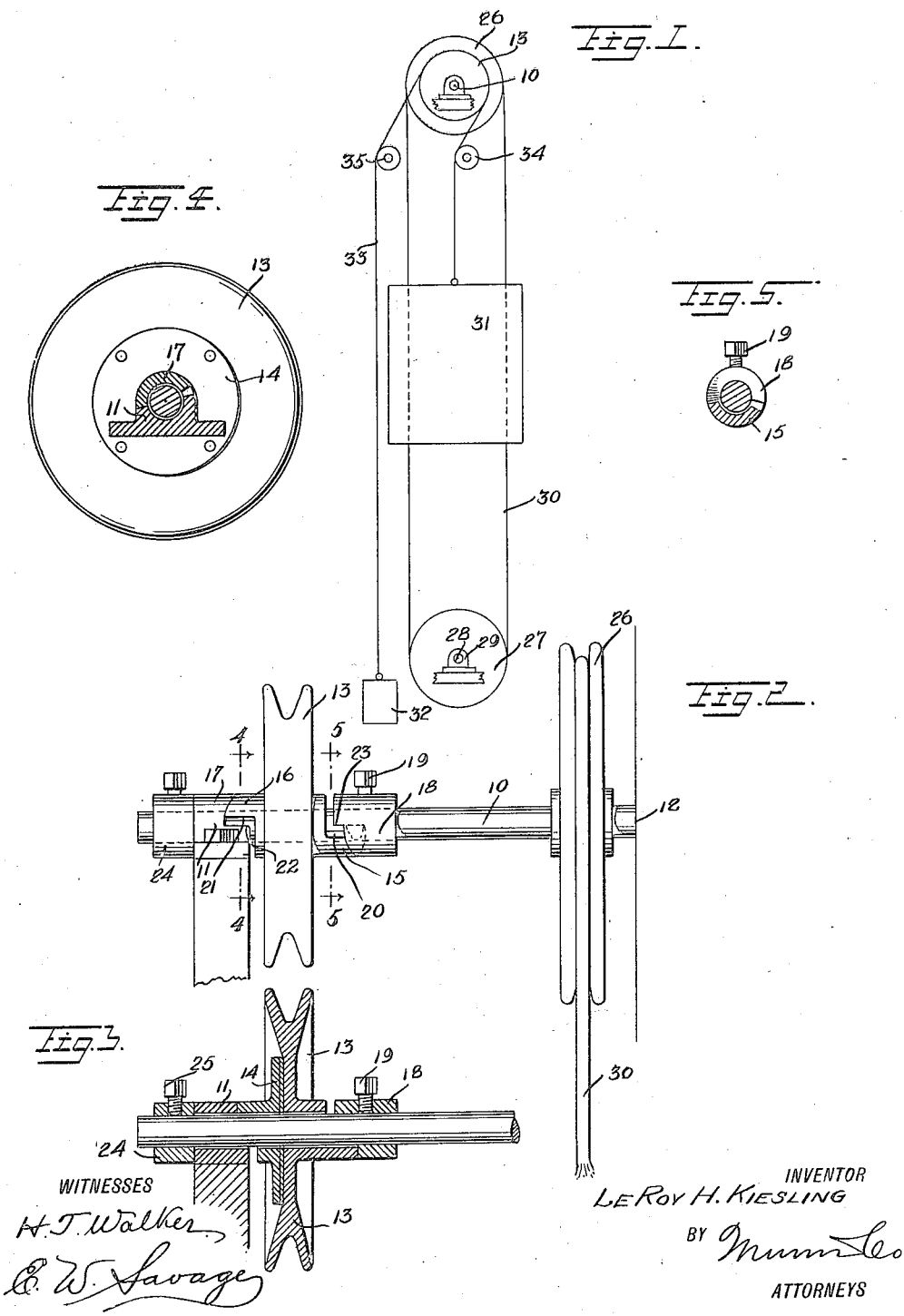

1,435,859

UNITED STATES PATENT OFFICE.

LE ROY H. KIESLING, OF BROOKLYN, NEW YORK.

HOISTING APPARATUS.

Application filed August 2, 1921. Serial No. 489,251.

*To all whom it may concern:*

Be it known that I, LE ROY H. KIESLING, a citizen of the United States, and a resident of the city of New York, borough of Brooklyn, in the county of Kings and State of New York, have invented a new and Improved Hoisting Apparatus, of which the following is a full, clear, and exact description.

This invention relates to a hoisting apparatus, primarily designed for use with dumb waiters and hand operated elevators.

The object of this invention is to provide a simple and efficient hoisting device which has means in conjunction with the hoisting wheel for stopping its rotation when the shaft on which it is loosely mounted ceases to rotate.

This and other objects of the invention will be more clearly understood from the detailed description and accompanying drawings.

Figure 1 is a plan of the hoisting apparatus, showing the cage and the means for operating the apparatus;

Figure 2 is a side elevation in part of the hoisting apparatus;

Figure 3 is a cross section of the hoisting apparatus;

Figure 4 is a section along the line 4—4, Figure 2; and

Figure 5 is a section along the line 5—5, Figure 2.

Referring to the above-mentioned drawings, a shaft 10 is rotatably mounted in bearings 11 and 12. Loosely mounted on this shaft is a grooved wheel 13 and a friction wheel 14. These wheels are so mounted that they may be rotated relative to the shaft or moved lengthwise on the shaft. The grooved wheel 13 has a face which is equal in diameter to the face of the friction wheel 14. Integral with the hub of the grooved wheel 13 is a cam 15 and integral with the friction wheel 14 is another cam 16. Both of these cams extend outward from the wheels along the shaft 10. Integral with the bearing 11 is a cam 17 and fixed to the shaft 10 on the opposite side of the wheel to the cam 17 is another cam 18 which is held in position by means of a set screw 19. Provided in conjunction with the cams 15, 16, 17 and 18 are shoulders 20, 21, 22 and 23. A ring member 24 is mounted on the shaft 10 and fixed thereto by means of a set screw 25 and serves to hold the shaft against lengthwise movement.

A pulley 26 is fixed to the shaft 10 and located in alinement with it is a pulley 27 mounted on a shaft 28. This shaft is held in position by means of bearings 29 carried by the frame which encloses the cage of the dumb waiter. A rope 30 passes around pulleys 26 and 27. This rope serves as a means for operating the shaft 10 through the pulley 26. A cage 31 and a weight 32 are connected together by means of a rope 33 which passes over the grooved wheel 13. Pulleys 34 and 35 are provided to guide the rope 33.

The operation of this device is as follows:

When the shaft 10 is brought to rest and the weight is in the cage 31, the grooved wheel 13 over which the rope 33 is hung is rotated forcing the cam 15 against the cam 18, moving the wheel 13 to the left and forcing it into contact with the friction wheel 14. The friction wheel 14 is rotated with the grooved wheel and forces the cam 16 into contact with the cam 17, and the two cams 15 and 16 are wedged between the cams 17 and 18 thus stopping the rotation of the wheel 13. The cage 31 may be raised to any desired position and on bringing the shaft 10 to rest, the grooved wheel after rotating through a very small angle will become locked and hold the cage 31 in position. If it is desired to raise or lower the cage 31 from this position the shaft 10 is rotated by means of the rope 30 and the pulley 26. In order to raise the cage 31 the shaft 10, as seen in Figure 1, is rotated counter-clockwise. This rotates the cam 18 and releases the cam 15 allowing the wheel 13 to move along the shaft away from the friction wheel 14, and a shoulder on the cam 15 engages with a shoulder on the cam 18 and the grooved wheel 13 is rotated. If it is desired to lower the cage 31, the shaft 10, as seen in Figure 1, is rotated clockwise. This clockwise rotation of the shaft moves the cam 16 out of contact with the cam 17 and allows the friction wheel 14 to move to the left, as seen in Figure 2, and out of contact with the friction wheel 13. The shoulder 23 of the cam 18 engages with the shoulder 20 of the cam 15 and rotates the grooved wheel 13.

I wish to state in conclusion that while the illustrated examples constitute a practical embodiment of my invention, I do not limit myself strictly to the mechanical details herein illustrated since manifestly the same can be considerably varied without departing from the spirit of the invention as defined in the appended claims.

Claims.

1. A hoisting device of the class described, comprising a shaft, means loosely mounted on the shaft for operating a draft rope, a friction disk loosely mounted on the shaft, and means for forcing the draft rope operating means and friction disk into engagement, said means also serving to hold the draft rope operating means against rotation.

2. A hoisting device of the class described, comprising a shaft, wheel means loosely mounted on the shaft for operating a draft rope, a friction disk loosely mounted on the shaft, cam means fixed to the shaft, and stationary cam means associated with the shaft and co-operating with the cam means fixed to the shaft for forcing the draft rope wheel means into engagement with the friction disk and thus serving to retain the draft rope operating wheel means against rotation.

3. A hoisting device of the class described, comprising a shaft, fixed cam means in which said shaft rotates, wheel means for operating a draft rope loosely mounted on the shaft, a friction disk loosely mounted on the shaft, and cam means fixed to the shaft for forcing the wheel means and the friction disk into engagement with one another and against the fixed cam means when the shaft ceases to rotate said fixed cam means, serving to hold the wheel means against rotation.

4. A device of the class described comprising a shaft mounted in bearings, a grooved wheel and a friction wheel loosely mounted on the shaft, a cam integral with each wheel and extending outward along the shaft, a cam integral with one of the bearings and a cam fixed to the shaft, said last two cams co-operating with the wheel cams to force them together to stop the wheels from rotating on the shaft, and a pulley and rope for operating the shaft.

5. A device of the class described comprising a shaft mounted in bearings, a grooved wheel and a friction wheel each loosely mounted on the shaft, cams integral with the wheel and extending outward, a cam in conjunction with one of the bearings and co-operating with the friction wheel cam to force the friction wheel towards the grooved wheel, a cam fixed to the shaft and co-operating with the grooved wheel cam to move the grooved wheel toward the friction wheel, means for rotating the shaft one way to release the friction wheel cam and friction wheel to allow the grooved pulley to rotate with the shaft, and means for rotating the shaft the other way to release the grooved wheel from the friction wheel to allow it to rotate with the shaft.

6. A device of the class described comprising a shaft mounted in bearings, a grooved wheel and a friction wheel each loosely mounted on the shaft, cams integral with each wheel and extending outward, a cam integral with one bearing and another cam fixed to the shaft, a shoulder integral with the bearing to engage a shoulder on the friction wheel cam to stop the friction from rotating as the grooved wheel rotates one way, a shoulder on the cam fixed to the shaft for engaging a shoulder on the grooved wheel cam to rotate the grooved wheel against a load, and a pulley and rope for rotating the shaft.

7. In combination with a dumb waiter including a cage, a balancing weight and a connecting rope, a hoisting device comprising a shaft, a grooved wheel for carrying the connecting rope and a friction wheel both loosely mounted on the shaft, means co-operating with the two wheels to force them into contact and stop rotation when the shaft ceases to rotate, means for releasing the wheels from one another to allow rotation of the grooved wheel with the shaft, and means in conjunction therewith to operate the shaft.

8. A hoisting device of the class described, comprising a shaft, wheel means for operating a draft rope loosely mounted on the shaft, wheel engaging means loosely mounted on the shaft, and means for forcing the wheel engaging means together, said means serving to hold the draft rope wheel means against rotation.

LE ROY H. KIESLING.